US006549436B1

(12) United States Patent
Sun

(10) Patent No.: US 6,549,436 B1
(45) Date of Patent: Apr. 15, 2003

(54) INTEGRATED MAGNETIC CONVERTER CIRCUIT AND METHOD WITH IMPROVED FILTERING

(75) Inventor: Jian Sun, Cedar Rapids, IA (US)

(73) Assignee: Innovative Technology Licensing LLC, Thousand Oaks, CA (US)

( * ) Notice: Subject to any disclaimer, the term of this patent is extended or adjusted under 35 U.S.C. 154(b) by 0 days.

(21) Appl. No.: 10/080,142

(22) Filed: Feb. 21, 2002

(51) Int. Cl.$^7$ .......................... H02M 1/12; H02M 1/14; H02M 7/00
(52) U.S. Cl. ............................ 363/44; 363/48; 363/68; 363/61
(58) Field of Search ................. 363/39, 44, 48, 363/60, 61, 68, 69, 126

(56) References Cited

U.S. PATENT DOCUMENTS

| | | | | |
|---|---|---|---|---|
| 5,663,876 A | * | 9/1997 | Newton et al. | 363/126 |
| 5,870,299 A | * | 2/1999 | Rozman | 363/127 |
| 5,933,338 A | * | 8/1999 | Wallace | 363/61 |
| 6,011,703 A | * | 1/2000 | Boylan et al. | 363/21.06 |
| 6,069,799 A | * | 5/2000 | Bowman et al. | 363/20 |
| 6,084,792 A | * | 7/2000 | Chen et al. | 363/127 |
| 6,163,466 A | | 12/2000 | Davila, Jr. et al. | 363/17 |
| 6,188,586 B1 | * | 2/2001 | Farrington et al. | 363/17 |
| 6,356,462 B1 | * | 3/2002 | Jang et al. | 363/17 |
| 6,388,898 B1 | * | 5/2002 | Fan et al. | 363/20 |
| 6,392,902 B1 | * | 5/2002 | Jang et al. | 363/17 |

OTHER PUBLICATIONS

"Circuit Reinvention In Power Electronics And Identification Of Prior Work"; Severns R.; pp. 3–9; 1997; Proceedings of 1997 IEEE Applied Power Electronics Conference (APEC '97).

"A New Output Rectifier Configuration Optimized for High Frequency Operation"; O'Meara K.; pp. 219–225; Jun. 1991; Proceedings of 1991 High Frequency Power Conversion (HFPC '91) Conference.

"A New Efficient High Frequency Rectifier Circuit"; Peng et al.; pp. 236–243; Jun. 1991; Proceedings of 1991 High Frequency Power Conversion (HFPC '91) Conference.

"Coupled–Inductor Current–Doubler Topology in Phase–Shifted Full–Bridge DC–DC Converter"; Pietkiewicz et al; Published as "*Proceedings of INTELEC '98*, paper 2–3, 1998".

"Design of High Efficiency, Low Profile, Low Voltage Conveter With Integrated Magnetics"; Chen et al.; pp. 911–917; 1997; Proceedings of 1997 IEEE Applied Power Electronics Conference (APEC '97).

"A Novel Integrated Current Doubler Rectifier"; Xu et al.; 2000; Published as "*Proc. IEEE 2000 Applied Power Electronics Conference*, pp. 735–740."

"Unified Analysis of Half–Bridge Converters with Current–Doubler Rectifier"; Sun et al.; 2001; Published as "*Proceedings of 2001 IEEE Applied Power Electronics Conference*, pp. 514–520, 2001."

"Static and Dynamic Analysis of Zero–Voltage–Switched Half–Bridge Converter With PWM Control"; Ninomiya et al.; pp. 230–237; 1991; Proceedings of 1991 IEEE Power Electronics Specialists Conference (PESC '91).

* cited by examiner

Primary Examiner—Bao Q. Vu

(57) ABSTRACT

A converter and rectifier circuit comprises a magnetic core, a first secondary winding, a second secondary winding, a third secondary winding, a first rectifier, a second rectifier and an output capacitor. The first, second and third secondary windings are wound around the magnetic core and are connected to each other. The first rectifier is connected to the first secondary winding and the second rectifier is connected to the second secondary winding. The output capacitor is connected to the first and second rectifiers and is connected in series with the third secondary winding.

22 Claims, 3 Drawing Sheets

INTEGRATED MAGNETIC CONVERTER CIRCUIT AND METHOD WITH IMPROVED FILTERING

The U.S. Government has a paid-up license in this invention and the right in limited circumstances to require the patent owner to license others on reasonable terms as provided for by the terms of the contract number N00014-99-3-0006 awarded by the United States Navy.

FIELD OF THE INVENTION

This invention relates to switching power converter circuits and methods and, in particular, relates to a integrated magnetic converter circuit and method with improved filtering.

BACKGROUND OF THE INVENTION

Switching power converters are used in a wide variety of applications to convert power from one form to another form. For example, dc/dc converters are used to convert dc power provided at one voltage level to dc power at another voltage level. Such dc/dc converters often use rectifier circuits, such as the well-known current-doubler rectifier (CDR) circuit. The CDR circuit has recently been rediscovered for use in high frequency dc/dc converter applications. The low current stresses in the transformer secondary, the inductors, and the rectifiers makes the circuit attractive for dc/dc converters with high output currents. The circuit can be used with different double-ended primary topologies, such as push-pull, half bridge and full bridge.

Early CDR circuits used three separate magnetic components, namely, one transformer and two inductors. However, this configuration results in interconnection losses which negatively impact efficiency, especially in high current applications. Additionally, this configuration results in increased size and cost. To address these problems, integrated magnetic implementations have been proposed that combine the transformer and the inductors into a single magnetic structure with one magnetic core, thereby reducing the size and the interconnection losses.

While this solution addresses some problems, further improvements are still needed. In particular, the effective filtering inductance of existing integrated magnetic implementations for CDR circuits is low due to the use of a single turn secondary for low conduction losses, resulting in high ripple currents and output ripple voltage. The circuit is also more likely to operate in a discontinuous conduction mode when the inductance is low, which is less efficient compared to a continuous conduction mode of operation. Accordingly, an improved rectifier circuit which overcomes one or more of the above problems would be highly advantageous.

SUMMARY OF THE INVENTION

According to a first preferred aspect, a converter and rectifier circuit comprises a magnetic core, a first secondary winding, a second secondary winding, a third secondary winding, a first rectifier, a second rectifier and an output capacitor. The first, second and third secondary windings are wound around the magnetic core and are connected to each other. The first rectifier is connected to the first secondary winding and the second rectifier is connected to the second secondary winding. The output capacitor is connected to the first and second rectifiers and is connected in series with the third secondary winding.

According to a second preferred aspect, a dc/dc conversion method comprises providing a voltage to a primary winding of a transformer. The voltage causes a first current to flow in a first secondary winding, a second current to flow in a second secondary winding, and a third current to flow in a third secondary winding, the third current being a summation of the first and second currents. The method further comprises rectifying the first current using a first rectifier, rectifying the second current using a second rectifier, and filtering the third current using inductance of the third secondary winding. The third winding is connected in series with an output capacitor. The method further comprises charging the output capacitor using the third current and providing dc power to a power-consuming device using the output capacitor.

DETAILED DESCRIPTION OF THE PREFERRED EMBODIMENTS

Figure 1:
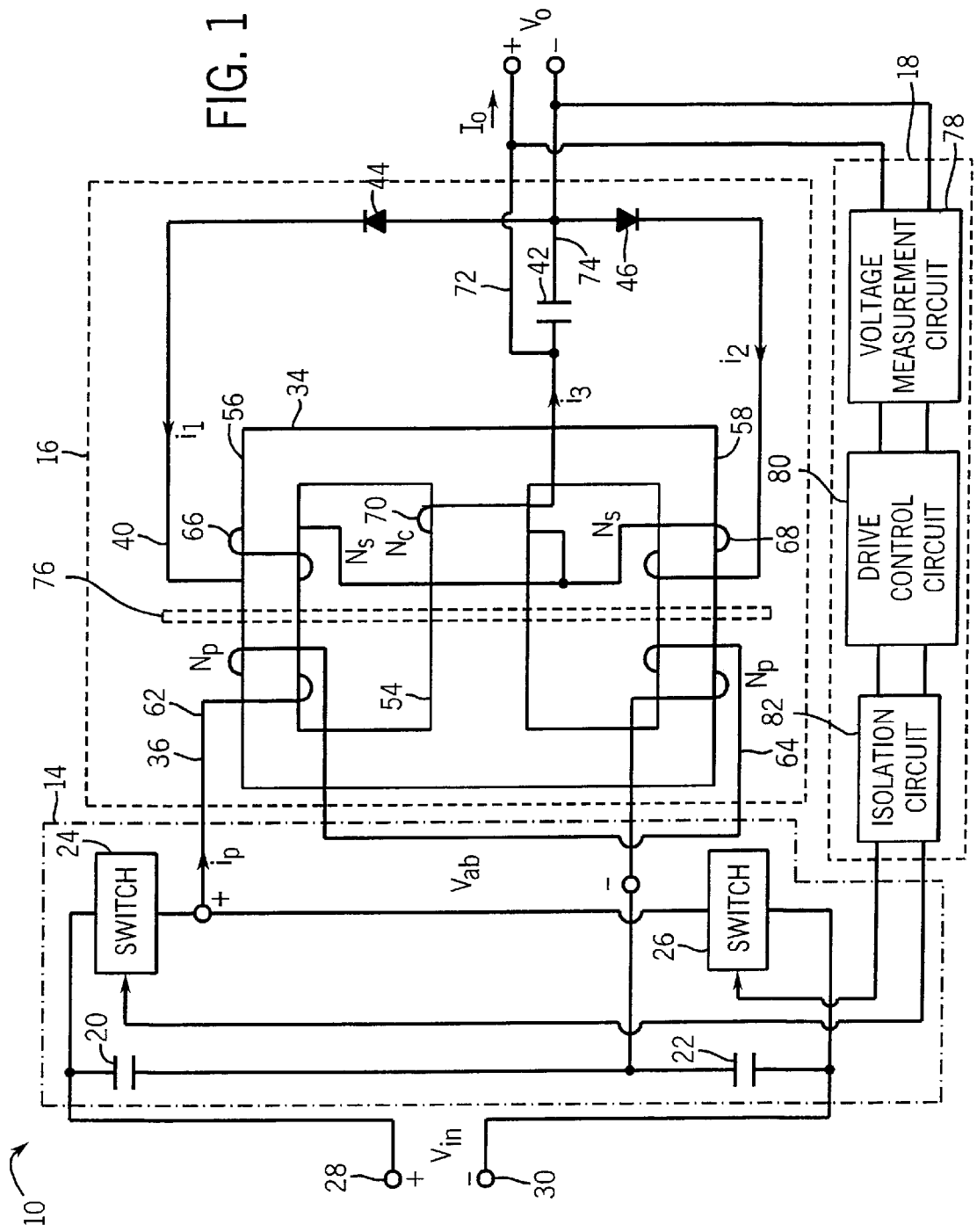
FIG. 1 is a dc/dc converter circuit employing an integrated current-doubler rectifier according to a preferred aspect of the invention.

Referring now to FIG. 1, a dc/dc converter circuit 10 that employs an integrated current doubler rectifier (CDR) circuit according to a preferred embodiment of the invention is illustrated. The system 10 comprises an drive circuit 14, an integrated CDR circuit 16, and a feedback control circuit 18.

The drive circuit 14 may have a variety of configurations. In FIG. 1, the drive circuit 14 is shown to have a double-ended, half-bridge topology which is capable of applying positive, negative, and zero voltage to the CDR circuit 16. To this end, the drive circuit 14 comprises first and second capacitors 20 and 22 and first and second switches 24 and 26. The capacitors 20 and 22 and switches 24 and 26 receive dc power from a dc voltage source at input terminals 28 and 30. The drive circuit 14 is connected across the windings 62 and 64 and provides a pulse width modulated voltage to the windings 62 and 64. The capacitors 20 and 22 may, for example, be electrolytic tantalum capacitors. The switches 24 and 26 may be transistors such as power MOSFETs.

The integrated CDR circuit 16 comprises a magnetic core 34, a primary winding arrangement 36, a secondary winding arrangement 40, an output capacitor 42, and first and second rectifiers 44 and 46. The magnetic core 34 comprises a center leg 54, a first outer leg 56, and a second outer leg 58. The outer legs 56 and 58 are disposed on opposite sides of the center leg 54.

The primary winding arrangement 36 comprises a primary winding that is formed of a first primary winding 62 which is wound around the outer leg 56 and a second primary winding 64 which is wound around the outer leg 58. The secondary winding arrangement 40 comprises first, second and third secondary windings 66, 68, 70. The winding 66 is wound around the outer leg 56 of the magnetic core 34, the winding 68 is wound around the outer leg 58 of the magnetic core 34, and the winding 70 is wound around the center leg 54 of the magnetic core 34. As described in greater detail below, the winding 70 increases the filtering inductance of the CDR circuit 16, and thereby reduces voltage and current ripple and improves efficiency.

The winding 70 is connected in series with the output capacitor 42. The output capacitor has first and second terminals 72 and 74 which form the output terminals of the integrated current-doubler rectifier 16 and the dc/dc converter circuit 10. The rectifier 44 is connected between the output capacitor 42 and the winding 66. The rectifier 46 is connected between the output capacitor 42 and the winding 68.

The magnetic core 34 is mounted on a multi-layer circuit board 76. The legs 54–58 of the magnetic core 34 extend through holes formed in the circuit board 76. The windings 62–70 are at least partially formed by traces on the multi-layer circuit board 76.

The feedback control circuit 18 comprises a voltage measurement circuit 78, a drive control circuit 80, and an isolation circuit 82. The voltage measurement circuit 78 is connected to the output capacitor 42 to measure an output voltage across the output terminals 72 and 74. The feedback control circuit 18 controls the switching of the drive circuit 14 to vary the duty cycle of the drive circuit 14 based on a voltage feedback signal from the voltage measurement circuit 78. The duty cycle is controlled so as to minimize deviation of the output voltage from a predetermined setpoint level. The feedback control circuit 18 also controls the rectifiers 44 and 46 when they are implemented by active switches, such as power MOSFETs. The isolation circuit 82, which may comprise an isolation transformer, provides electrical isolation between the electrical components on either side of the magnetic core 34.

In operation, a dc voltage is received at the input terminals 28 and 30 of the dc/dc converter circuit 10. The dc voltage is applied to the capacitors 20 and 22 and the switches 24 and 26. The switches 24 and 26 are controlled by the drive control circuit 80 such that at most only one switch 24, 26 is on at a time (see FIG. 4). The switches 24 and 26 apply a pulse-width modulated dc voltage to the primary winding formed of the subwindings 62 and 64. This causes a first current $i_1$ to flow in the winding 66, a second current $i_2$ to flow in the winding 68, and a third current $i_3$ to flow in the winding 70 (where $i_1+i_2=i_3$), though ordinarily not all at the same time. The current $i_1$ flowing the winding 66 is rectified by the rectifier 44 and the current $i_2$ flowing in the winding 68 is rectified by the rectifier 46. Thus, whether current flows through the winding 66 or the winding 68 depends on the states of the switches 24 and 26. If the rectifiers 44 and 46 are diodes, then the rectifiers 44 and 46 are controlled by virtue of the bias voltages that are built up across the rectifiers 44 and 46. If the rectifiers 44 and 46 are synchronous rectifiers (implemented, for example, using MOSFETs), then the rectifiers 44 and 46 are controlled by the drive control circuit 80. Typically, synchronous rectifiers are controlled so as to operate in the same manner as diodes, but are used in situations where the converter circuit 10 produces a low output voltage. The converter circuit 10 uses the third current $i_3$ to charge the output capacitor 42, which then provides power to a power-consuming device. The operation of the converter circuit 10 in different switch states is described in greater detail in connection with FIGS. 24.

Figure 2:
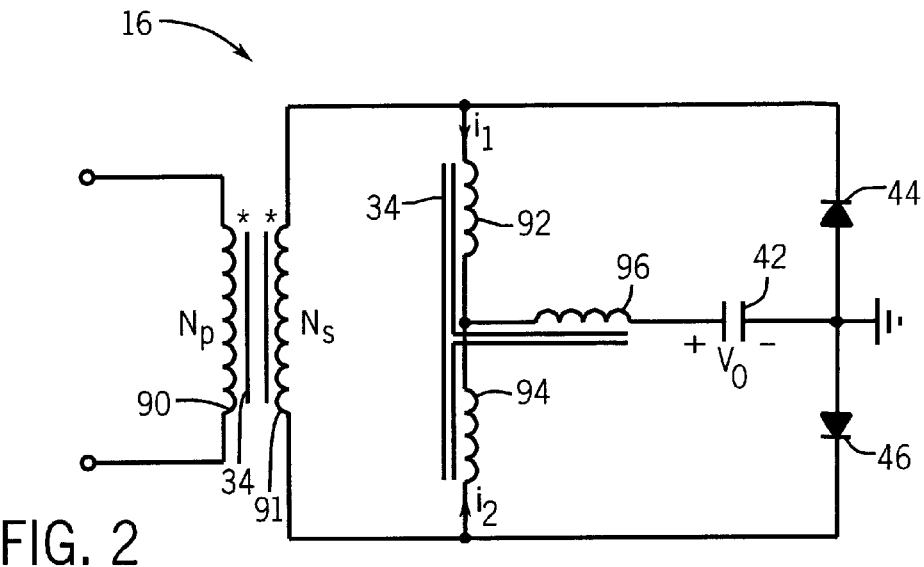
FIG. 2 is a schematic diagram of the circuit implemented by the integrated current doubler rectifier construction of FIG. 1.
Figure 3:
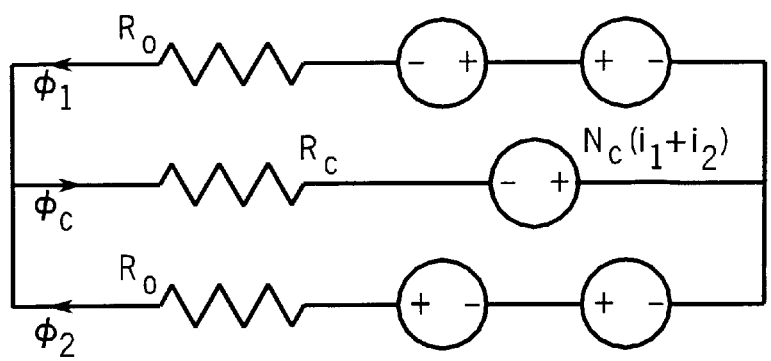
FIG. 3 is a reluctance model of the magnetic component for the integrated current doubler rectifier of FIG. 1.
Figure 4:
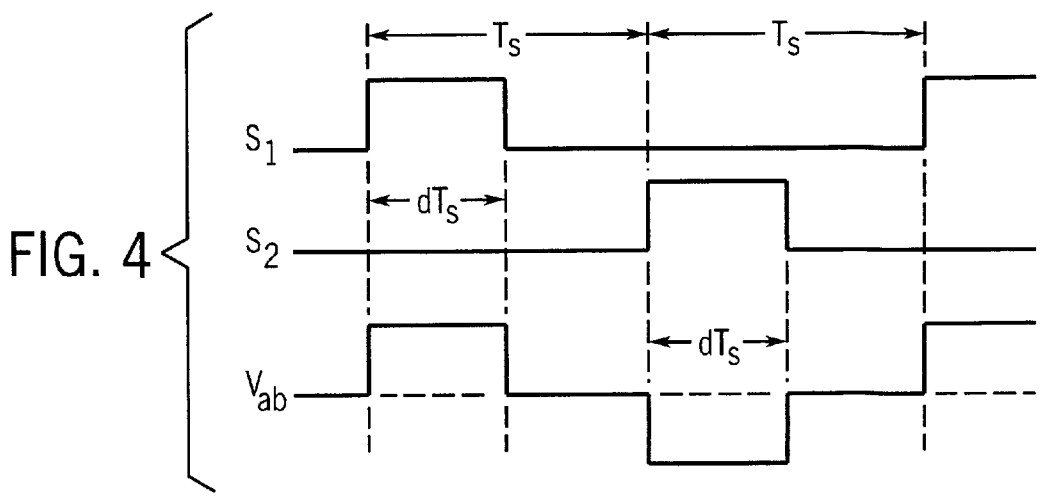
FIG. 4 is a timing diagram showing gate signals applied to a drive circuit of the converter circuit of FIG. 1.

Referring now also to FIGS. 2–4, FIG. 2 is a schematic diagram showing the circuit that is implemented by the construction of the integrated CDR circuit 16 of FIG. 1, and FIG. 3 is a reluctance model of the magnetic component of the integrated CDR circuit 16. As shown in FIG. 2, the resultant circuit comprises a primary winding 90 (implemented by the primary windings 62 and 64 in FIG. 1), a secondary winding 91 (implemented by the secondary windings 66 and 68), a first inductor 92 (implemented by the secondary winding 66), a second inductor 94 (implemented by the secondary winding 68), and a third inductor 96 (implemented by the secondary winding 70).

A mathematical description of the preferred integrated CDR circuit 16 will now be given. Of course, it should be understood that other implementations may have different mathematical characterizations, and that the following description is merely exemplary for the construction shown.

First, the operation of the circuit 10 when the voltage applied to the primary winding 90 is greater than zero ($V_{ab}>0$) will be described. When $V_{ab}>0$, the rectifier 44 conducts, the rectifier 46 is reverse biased, and therefore the secondary currents $i_1$ and $i_2$ are as follows: $i_1>0$ and $i_2=0$. The flux in the three legs can be determined from FIG. 3 as follows:

$$\phi_1 = \frac{i_1}{2R_c + R_o} \cdot \left[N_s\left(1 + \frac{R_c}{R_o}\right) + N_c\right] - \frac{N_p i_p}{R_o} \quad (1)$$

$$\phi_2 = \frac{i_1}{2R_c + R_o} \cdot \left[-N_s \cdot \frac{R_c}{R_o} + N_c\right] + \frac{N_p i_p}{R_o} \quad (2)$$

$$\phi_c = \phi_1 + \phi_2 = \frac{2N_c + N_s}{2R_c + R_o} \cdot i_1 \quad (3)$$

where $\phi_c$, $\phi_1$, and $\phi_2$ are the fluxes in the legs 54, 56, and 58, respectively, $\mathcal{R}_c$ is the reluctance of the center leg 54, $\mathcal{R}_o$ is the reluctance of the outer legs 56 and 58, $N_c$ is the number of turns on the winding 70, $N_s$ is the number of turns on each of the windings 66 and 68, and $N_p$ is the number of turns on each of the windings 62 and 64.

The fluxes $\phi_c$, $\phi_1$, and $\phi_2$ meet the following differential equations:

$$\begin{cases} N_p \dfrac{d\phi_2}{dt} - N_p \dfrac{d\phi_1}{dt} = v_{ab} \\ N_s \dfrac{d\phi_1}{dt} + N_c \dfrac{d\phi_c}{dt} = -v_0 \end{cases} \quad (4)$$

where $V_{ab}$ is the voltages applied to the primary winding 90 and the secondary winding 91, and $V_0$ is the output voltage at the capacitor 42.

Substituting Eqs. (1)–(3) into Eq. (4), and solving for the primary and the secondary currents $i_1$ and $i_p$, yields the following equations:

$$\frac{di_1}{dt} = \frac{N_s v_{ab} - 2N_p v_o}{N_p(2N_c + N_s)^2} \cdot (2R_c + R_o) \quad (5)$$

$$\frac{di_p}{dt} = \frac{2N_c^2 R_o + 2N_c N_s R_o + N_s^2(R_c + R_o)}{N_p^2(2N_c + N_s)^2} \cdot v_{ab} - \frac{N_s(R_c + R_o)v_0}{N_p(2N_c + N_s)^2} \quad (6)$$

The filtering inductance L' and magnetizing inductance $L_m'$ are defined as follows:

$$L' = \frac{(N_s + 2N_c)^2}{2\mathcal{R}_c + \mathcal{R}_o}, \quad L'_m = \frac{2N_p^2}{\mathcal{R}_o}, \tag{7}$$

With these definitions, the above current equations (5)–(6) can be rewritten as follows:

$$\begin{cases} L'\dfrac{di_1}{dt} = \dfrac{N_s}{N_p} \cdot v_{ab} - 2v_0 \\ \dfrac{di_p}{dt} = \left[\dfrac{1}{L'_m} + \dfrac{1}{2L'} \cdot \left(\dfrac{N_s}{N_p}\right)^2\right] \cdot v_{ab} - \dfrac{N_s}{N_p} \cdot \dfrac{v_o}{L'} \end{cases} \tag{8}$$

Using the same notations and procedure, the following equations can be derived for the case of $v_{ah}<0(i_1=0, i_2>0)$:

$$\begin{cases} L'\dfrac{di_1}{dt} = -\dfrac{N_s}{N_p} \cdot v_{ab} - 2v_0 \\ \dfrac{di_p}{dt} = \left[\dfrac{1}{L'_m} + \dfrac{1}{2L'} \cdot \left(\dfrac{N_s}{N_p}\right)^2\right] \cdot v_{ab} + \dfrac{N_s}{N_p} \cdot \dfrac{v_o}{L'} \end{cases} \tag{9}$$

Again, using the same notations and procedure, the following equations can be derived for the case of $v_{ah}=0(i_1>0, i_2>0)$:

$$\begin{cases} L'\dfrac{d(i_1+i_2)}{dt} = -2v_0 \\ \dfrac{di_p}{dt} = 0 \end{cases} \tag{10}$$

Equations (8)–(10) confirm that the integrated CDR circuit 16 has the same functionality as a discrete CDR circuit with the effective filtering inductance L and the transformer magnetizing inductance $L_m$ determined as follows:

$$\begin{cases} L = L' \\ \dfrac{1}{L_m} = \dfrac{1}{L'_m} - \left(\dfrac{N_s}{N_p}\right)^2 \cdot \dfrac{1}{2L'} \end{cases} \tag{11}$$

Using the flux equation (3), the flux density $B_c$ in the center leg 54 is given by the equation (12):

$$B_c = \frac{(N_s + 2N_c)(i_1 + i_2)}{(2\mathcal{R}_c + \mathcal{R}_o)A_c} \tag{12}$$

where $A_c$ is the cross-sectional area of the leg 54.

Assuming the flux density is kept under a maximum value, $B_{max}$, to avoid saturation of the magnetic core 34, then the following equation holds true:

$$2\mathcal{R}_c + \mathcal{R}_o \geq \frac{(N_s + 2N_c)(i_1 + i_2)}{A_c B_{max}} \approx \frac{(N_s + 2N_c)I_0 A_c B_{max}}{A_c B_{max}} \tag{13}$$

where $l_o$ is the load current, and the approximation holds when ignoring the ripple currents of $i_1$ and $i_2$. This in turn defines a maximum inductance L' achievable with the CDR circuit 16, as given by Eq. (14):

$$L' \leq \frac{(N_s + 2N_c)A_c B_{max}}{I_0} = \frac{N_s A_c B_{max}}{I_0} + \frac{2N_c A_c B_{max}}{I_0} \tag{14}$$

The last term in Eq. (14) is the additional inductance due to the winding 70 on the center leg 54. Assuming a single-turn secondary ($N_s=1$), it can be seen from Eq. (14) that adding a single turn to the winding 70 ($N_c=1$) triples the effective filtering inductance as compared to a center leg 54 with no winding.

In order to further explain the design and operation of the converter circuit 10, a numeric example is now given. Typically, the converter circuit 10 may be used to provide a low voltage (e.g., less than about 10V, and preferably less than about 5V), high current output (e.g., more than about 5 A, and preferably more than about 10 A). As an example, input and output specifications for the converter include $V_{in}$=48V, $V_o$=3.3V, $l_o$=30 A $P_{out}$=100 W.

The drive control circuit 80 is assumed to operate the converter circuit 10 in a symmetric mode of operation. The converter circuit 10 could also be operated in an asymmetric mode, which has the advantage of allowing the primary switches to turn on under zero drain-to-source voltages, resulting in low switching losses. However, asymmetric mode has the disadvantage of high conduction losses due to the asymmetric current stresses of the secondary components, including the magnetics and the rectifiers. The increase in conduction losses can be especially critical in low output-voltage, high output-current converters, which is the example presented. FIG. 4 shows the gate signals for the switches 24 and 26 under symmetric control. The switching frequency may, for example, be 400 kHz.

With reference to equations (8)–(10), the output voltage $V_o$ of the converter 10 in steady state satisfies the following volt-second balance relation:

$$\left(\frac{N_s}{N_p} \cdot \frac{V_{in}}{2} - 2V_0\right)D = 2V_0(1-D) \tag{15}$$

Hence, the steady state output voltage $V_o$ is given by the following equation:

$$V_0 = \frac{N_s V_{in} D}{4N_p} \tag{16}$$

The turns ratio ($N_p:N_s$) is preferably selected such that the duty ratio is approximately 50% under nominal input. With an input voltage $V_{in}$ of 48V and an output voltage $V_o$ of 3.3V as set forth above, a 2:1 turns ratio may be used, which results in 55% duty ratio under ideal conditions. Furthermore, to reduce winding conduction losses, the center-leg winding 70 on the center leg 54 and the two secondary windings 66 and 68 on the outer legs 56 and 58 preferably have a single turn (i.e., $N_p$=2, $N_s$=1, $N_c$=1).

The magnetic core 34 may be selected based on predicted core and winding losses. In one embodiment, a combination of E22/6/16 (planar E core, 3F 3 material) and PLT22/16/2.5 plate is used to form the magnetic core 34 (Data Handbook, MA01, Phillips Components 1996). Since the center-leg winding 70 carries all the load, current and the dc components of the fluxes on the two outer legs 56 and 58 are additive on the center leg 54, gapping of the center leg 54 is desirable in order to prevent saturation of the magnetic core 34. The length of the air gap x on the center leg 54 can be determined as follows. First, reluctance $\mathcal{R}_c$ and $\mathcal{R}_o$ are expressed by Eqs. (17) and (18):

$$\mathcal{R}_c = \frac{x}{4\pi 10^{-7} A_c} + \frac{(h-x)}{4\pi 10^{-7} \mu_r A_c}, \tag{17}$$

-continued $$R_o = \frac{l_o}{4\pi 10^{-7} \mu_r A_o}, \quad (18)$$

where h=3.2 mm is the height of the core window area, $A_c$=78.5 mm² is the cross-sectional area of the center leg, $A_o$=39.25 mm² is the cross-sectional area of the outer legs, $l_o$ is the length of the outer leg including the top and bottom portion of the core structure, and $\mu_r$ is the relative permeability of the core 34 which is assumed to be 1800. The steady state output current $l_o$ at full power is about 30 A (producing 100 W output at 3.3V). Based on these parameters and Eq. (12), the desired air gap length can be solved for any given maximum flux density, $B_{max}$, from the following equation:

$$\frac{30(N_s + 2N_c)}{(2R_c + R_o)A_c} = B_{max} \quad (19)$$

For $B_{max}$=150 mT, the solution is x=0.362 mm. Then, using Eq. (7), the corresponding inductance L' is found to be L'=1.17 μH.

Figure 5:
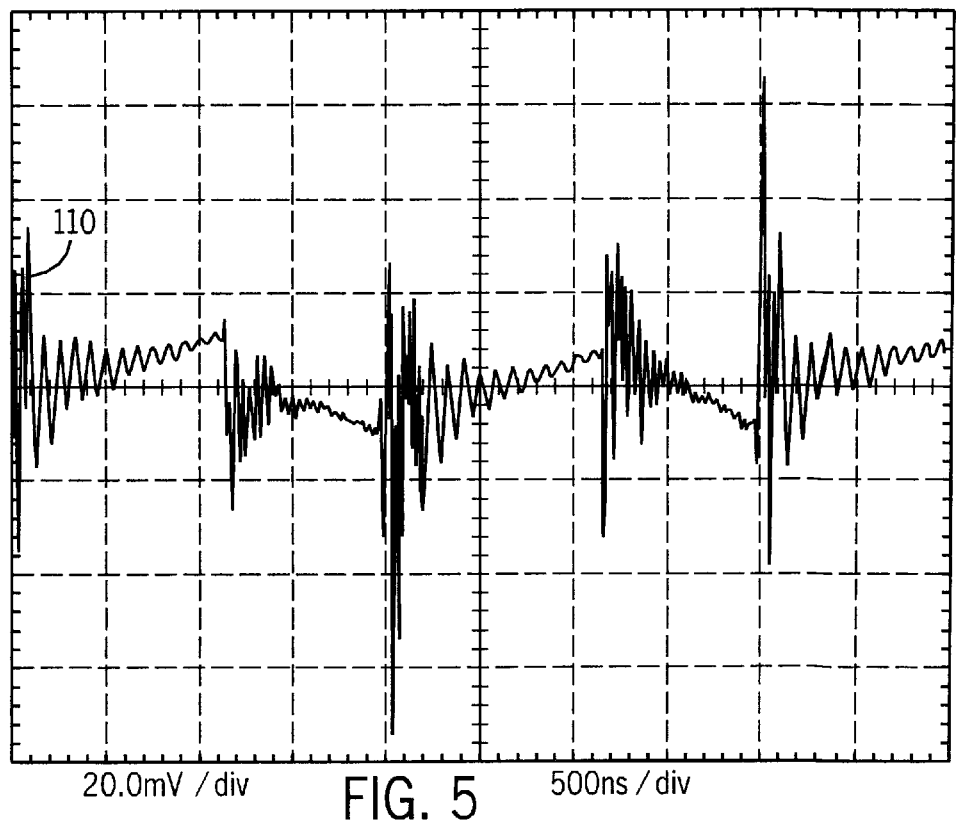
FIG. 5 is an alternative preferred integrated magnetic construction for the current doubler rectifier circuit according to another preferred aspect of the invention.

FIG. 5 is a graph of an output voltage $V_o$ (waveform 110) of the converter circuit 10 of FIGS. 1–5 as a function of time. The switching-frequency ripple in the output voltage $V_o$ is reduced by about a factor of three in the converter circuit 10 as compared to a converter circuit without winding on the center leg 54. The winding 70 increases the effective filtering inductance L' by a factor of three. The high frequency noise caused by device switching and parasitic ringing is also reduced by roughly the same factor. Additionally, the winding 70 significantly improves the efficiency at low switching frequency for a given output power, or at low output power under a given switching frequency. This is because of the increased filtering inductance that significantly reduces the secondary ripple and RMS current at low switching frequencies and/or under low output power, resulting in lower overall conduction losses despite the additional resistance presented by the center-leg winding.

Figure 6:
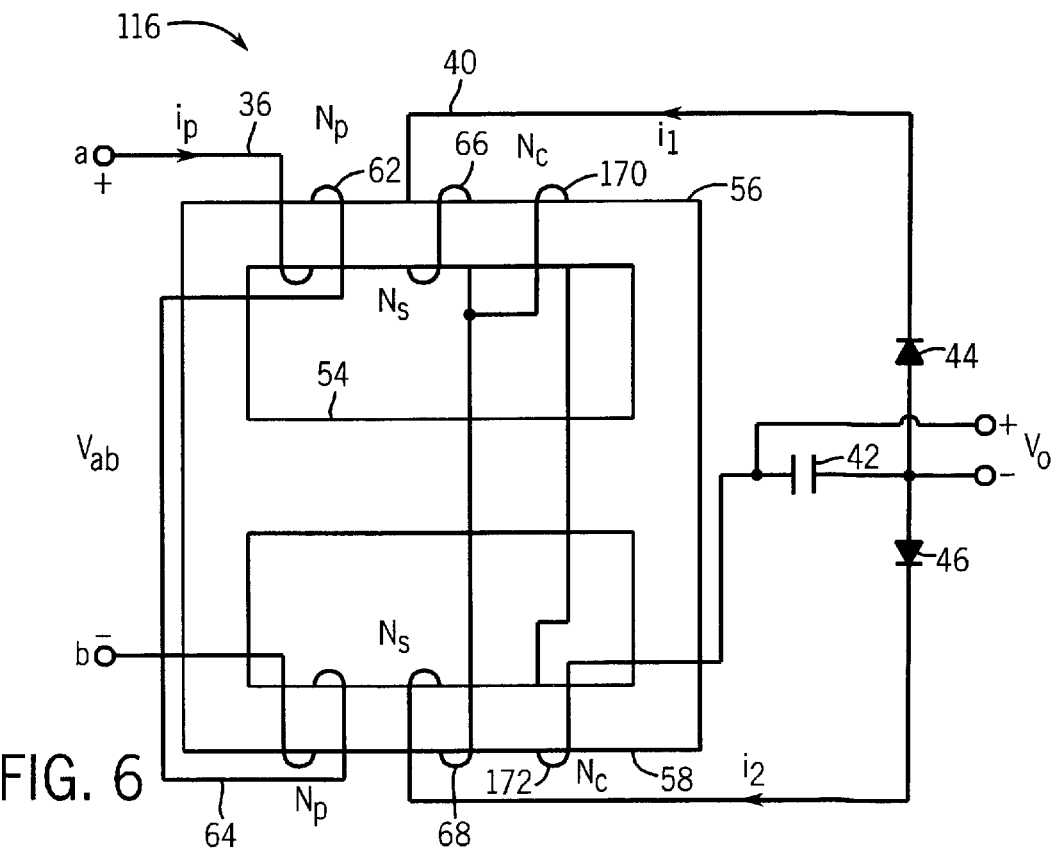
FIG. 6 is a graph of an output voltage of the converter circuit of FIG. 1 as a function of time.

FIG. 6 shows an alternative construction of an integrated CDR circuit 116. The construction of the integrated CDR circuit 116 is similar to the construction of the integrated CDR circuit 16 of FIG. 1, except that the winding 70 is replaced with two windings 170 and 172 wound on the outer legs 56 and 58, each of which has the same number of turns as the winding 70 and carries the total secondary current. The analysis presented in connection with FIGS. 1–5 applies to this construction as well. A disadvantage of this construction is the higher winding resistance due and the associated conduction losses to the series connection of two windings.

Although the invention has been described in conjunction with specific embodiments thereof, it is evident that many alternatives, modifications and variations will be apparent to those of ordinary skilled in the art. Accordingly, it is intended to embrace all such alternatives, modifications and variations that fall within the spirit and scope of the appended claims.

What is claimed is:

1. A rectifier circuit comprising:
   (A) a magnetic core;
   (B) a first secondary winding, the first secondary winding being wound around the magnetic core;
   (C) a second secondary winding, the second secondary winding being wound around the magnetic core;
   (D) a third secondary winding, the third secondary winding being wound around the magnetic core and being connected to the first and second secondary windings;
   (E) a first rectifier, the first rectifier being connected to the first secondary winding;
   (F) a second rectifier, the second rectifier being connected to the second secondary winding;
   (G) an output capacitor, the output capacitor being connected to the first and second rectifiers and being connected in series with the third secondary winding.

2. A circuit according to claim 1,
   wherein the transformer comprises a center leg and first and second outer legs which are disposed on opposite sides of the center leg,
   wherein the first secondary winding is wound on the first outer leg, the second secondary winding is wound on the second outer leg, and the third secondary winding is wound on the center leg.

3. A circuit according to claim 2, further comprising a primary winding, the primary winding further comprising
   (1) a first primary subwinding, the first primary subwinding being wound around the first outer leg of the magnetic core, and
   (2) a second primary subwinding, the second primary subwinding being wound around the second outer leg of the magnetic core, the second primary subwinding being connected in series with the first primary subwinding.

4. A circuit according to claim 1,
   wherein the transformer is mounted on a multi-layer circuit board, with the first and second outer legs and the center leg of the transformer extending through holes formed in the circuit board;
   wherein the first secondary winding, the second secondary winding, and the third secondary winding are at least partially formed by traces on the circuit board.

5. A circuit according to claim 1,
   wherein the transformer comprises a center leg and first and second outer leg which are disposed on opposite sides of the center leg,
   wherein the first secondary winding is wound on the first outer leg, the second secondary winding is wound on the second outer leg, and the third secondary winding is wound on the first and second outer legs.

6. A circuit according to claim 1, wherein the output capacitor produces a DC output voltage that is less than about ten volts and produces a DC output current that is more than about ten amps.

7. A circuit according to claim 1, wherein the output capacitor produces a DC output voltage that is less than about five volts and produces a DC output current that is more than about thirty amps.

8. A circuit according to claim 1, wherein the first and second secondary windings have less than five turns.

9. A circuit according to claim 1, wherein the first and second secondary windings have a single turn.

10. A circuit according to claim 1, wherein the first secondary winding, the second secondary winding, and the third secondary winding cooperate to give the circuit an effective filtering inductance having the form $$L = \frac{(N_s + 2N_c)^2}{2R_c + R_o},$$

where $N_s$ is the number of turns of the first secondary winding an the second secondary winding, $N_c$ is the number of turns of the third secondary winding, $R_c$ is a reluctance of the center leg of the magnetic core, and $\mathfrak{R}_o$ is a reluctance of the first and second outer legs of the magnetic core.

11. A dc/dc conversion method comprising:
providing a voltage to a primary winding of a transformer, the voltage causing a first current to flow in a first secondary winding, a second current to flow in a second secondary winding, and a third current to flow in a third secondary winding, the third current being a summation of the first and second currents;
rectifying the first current using a first rectifier;
rectifying the second current using a second rectifier;
filtering the third current using inductance of the third secondary winding, the third winding being connected in series with an output capacitor;
charging the output capacitor using the third current;
providing dc power to a power-consuming device using the output capacitor.

12. A method according to claim 11,
wherein the providing step is performed by a drive circuit; and
wherein the method further comprises controlling the drive circuit using a drive control circuit, the drive control circuit controlling the drive circuit such that a pulse-width modulated voltage is applied to the primary winding.

13. A method according to claim 12,
wherein the drive control circuit receives measurement of an output voltage of the output capacitor from a voltage measurement circuit; and
wherein the drive control circuit controls a duty cycle of the pulse width modulated voltage so as to minimize deviation of the output voltage from a predetermined setpoint level.

14. A method according to claim 13, wherein the predetermined setpoint level is less than about five volts.

15. A method according to claim 14, wherein the output capacitor provides an output current to the power consuming device that is greater than about thirty amps.

16. A method according to claim 11, wherein the output capacitor provides in excess of one-hundred watts of power to the power-consuming device.

17. A dc/dc converter circuit comprising:
(A) a magnetic core, the magnetic core having a center leg, a first outer leg, and a second outer leg, the first and second outer legs being disposed on opposite sides of the center leg;
(B) a primary winding;
(C) an output capacitor, the output capacitor having first and second terminals which respectively form first and second output terminals of the dc/dc converter circuit;
(D) a first secondary winding, the first secondary winding being wound around the first outer leg of the magnetic core,
(E) a second secondary winding, the second secondary winding being wound around the second outer leg of the magnetic core, and
(F) a third secondary winding, the third secondary winding implementing a filtering inductor and being connected in series with the output capacitor;

(G) a first rectifier, the first rectifier being connected between the output capacitor and the first secondary winding;
(H) a second rectifier, the second rectifier being connected between the output capacitor and the second secondary winding;
(I) a circuit board, the circuit board having the magnetic core mounted thereto, with the first and second outer legs and the center leg of the transformer extending through holes formed in the circuit board, and the circuit board having traces which at least partially form the primary winding, the first secondary winding, the second secondary winding, and the third secondary winding;
(J) an drive circuit, the drive circuit being connected to receive power from an input voltage source and being connected across the primary winding to provide a pulse width modulated voltage to the primary winding; and
(K) a feedback control circuit, the feedback control circuit including a voltage measurement circuit, the voltage measurement circuit being connected to the output capacitor to measure an output voltage across the first and second output terminals, and the feedback control circuit controlling the drive circuit to vary a duty cycle of a pulse width modulated voltage applied by the drive circuit to the primary winding, the duty cycle being controlled based on the measured output voltage to minimize deviation from of the output voltage from a setpoint level.

18. A circuit according to claim 17, wherein the third secondary winding is wound around the center leg of the magnetic core.

19. A circuit according to claim 17, wherein the third secondary winding comprises a first subwinding which is wound around the first outer leg and a second subwinding which is wound around the second outer leg.

20. A circuit according to claim 17, wherein the output capacitor produces a DC output voltage that is less than about ten volts and produces a DC output current that is more than about ten amps.

21. A circuit according to claim 20, wherein the output capacitor produces a DC output voltage that is less than about five volts and produces a DC output current that is more than about thirty amps.

22. A circuit according to claim 17, wherein the first secondary winding, the second secondary winding, and the third secondary winding cooperate to give the circuit an effective filtering inductance having the form $$L = \frac{(N_s + 2N_c)^2}{2\mathfrak{R}_c + \mathfrak{R}_o},$$

where $N_s$ is a number of turns of the first secondary winding an the second secondary winding, $N_c$ is the number of turns of the third secondary winding, $\mathfrak{R}_c$ is a reluctance of the center leg of the magnetic core, and $\mathfrak{R}_o$ is a reluctance of the first and second outer legs of the magnetic core.

* * * * *